United States Patent
Weber et al.

(10) Patent No.: US 12,060,947 B2
(45) Date of Patent: Aug. 13, 2024

(54) PRESSURE HOLDING VALVE FOR AN AIR SPRING AND AIR SPRING COMPRISING THE PRESSURE HOLDING VALVE

(71) Applicant: Vibracoustic SE, Darmstadt (DE)

(72) Inventors: Michael Weber, Buchholz (DE); Erhard Moog, Sittensen (DE)

(73) Assignee: Vibracoustic SE, Darmstadt (DE)

(*) Notice: Subject to any disclaimer, the term of this patent is extended or adjusted under 35 U.S.C. 154(b) by 390 days.

(21) Appl. No.: 17/518,861

(22) Filed: Nov. 4, 2021

(65) Prior Publication Data

US 2022/0146005 A1 May 12, 2022

(30) Foreign Application Priority Data

Nov. 9, 2020 (DE) .......................... 102020129491.3

(51) Int. Cl.
*F16F 9/34* (2006.01)
*F16K 15/02* (2006.01)
*F16K 27/02* (2006.01)

(52) U.S. Cl.
CPC .............. *F16K 15/026* (2013.01); *F16F 9/34* (2013.01); *F16K 27/0209* (2013.01)

(58) Field of Classification Search
CPC ....... F16K 15/026; F16K 27/0209; F16F 9/34
USPC ...... 267/33–35, 64.16–64.28, 120, 122, 123, 267/126; 188/322.21; 137/596.17, 137/625.25
See application file for complete search history.

(56) References Cited

U.S. PATENT DOCUMENTS

| 1,330,397 | A |   | 2/1920 | Schweinert et al. |
| 1,809,127 | A |   | 6/1931 | Johnson |
| 3,099,461 | A | * | 7/1963 | Stelzer ............... B60G 17/0525 |
|   |   |   |   | 137/596.1 |

(Continued)

FOREIGN PATENT DOCUMENTS

| DE |   | 1480866 C | 1/1969 |
| DE | 102009045773 A1 | 4/2011 |

(Continued)

OTHER PUBLICATIONS

European Search Report, 21201006.0, dated Mar. 21, 2022.
German Office Action, Application No. 10 2020 129 491.3, dated Jun. 2, 2021.

*Primary Examiner* — Christopher P Schwartz
(74) *Attorney, Agent, or Firm* — Fishman Stewart PLLC

(57) ABSTRACT

A pressure retaining valve including: a first valve body for an opening of an air spring, the first valve body having an access opening; a second valve body connected to the first valve body and having a chamber fluidly communicating with the access opening and having a side outlet opening; and a return member disposed outside the access opening in the chamber for providing a bias toward the access opening; a closure part disposed in the chamber and movable from a closed condition against the bias to an open condition; and an actuator part having a head portion, a shaft section, and a flow channel, the head portion disposed outside the access opening and having a larger diameter than the access opening, wherein the stem portion is movably disposed through the access opening into the chamber, and the actuator member can move the closure member out of the closed condition.

14 Claims, 9 Drawing Sheets

(56) References Cited

U.S. PATENT DOCUMENTS

| | | | | |
|---|---|---|---|---|
| 3,162,433 | A | * | 12/1964 | Smirl ................. B60G 17/0525 74/519 |
| 3,407,832 | A | | 10/1968 | Lutz |
| 3,519,011 | A | * | 7/1970 | Pennanen ............... F16K 17/00 137/508 |
| 4,429,856 | A | | 2/1984 | Jackson |
| 4,475,578 | A | | 10/1984 | Nidle |
| 4,827,976 | A | | 5/1989 | Heimbrodt et al. |
| 4,951,661 | A | * | 8/1990 | Sladek .............. A61M 16/0808 128/205.24 |
| 5,649,692 | A | * | 7/1997 | Gilsdorf ................ B60G 11/26 267/64.22 |
| 5,921,532 | A | * | 7/1999 | Pierce ............... B60G 17/0416 267/64.19 |
| 2004/0040596 | A1 | | 3/2004 | Tsai |
| 2012/0168005 | A1 | | 7/2012 | Rull et al. |
| 2014/0166138 | A1 | * | 6/2014 | Bisig ...................... B23P 11/00 29/890.12 |

FOREIGN PATENT DOCUMENTS

| | | |
|---|---|---|
| DE | 102012222982 A1 | 6/2014 |
| DE | 102007034581 B4 | 12/2014 |
| EP | 0848196 A2 | 6/1998 |
| EP | 0848196 A3 | 11/1998 |
| FR | 1053358 A | 2/1954 |
| GB | 2183312 A | 6/1987 |
| JP | 2005-172114 A | 6/2005 |
| WO | 07/118674 A2 | 10/2007 |

\* cited by examiner

PRESSURE HOLDING VALVE FOR AN AIR SPRING AND AIR SPRING COMPRISING THE PRESSURE HOLDING VALVE

CROSS-REFERENCE TO RELATED APPLICATIONS

This application claims priority to German Patent Application No. DE 10 2020 129 491.3, filed Nov. 9, 2020, the contents of which are hereby incorporated by reference in its entirety.

TECHNICAL FIELD

The invention concerns a pressure retaining valve for an air spring and an air spring comprising the pressure retaining valve.

BACKGROUND

Air springs whose volume can be adjusted by means of a pneumatic system can be used for the suspension of motor vehicles. For level control, air can be introduced into the air spring or air can be released from the air spring. To introduce air into the air spring, inlet valves are used which are inserted into an opening in the air spring. A hose is coupled to the inlet valves, which creates a pneumatic connection between a pressure source and the valve. To prevent pressure loss in the air spring, inlet valves are used that close automatically when the hose is decoupled from the inlet valves.

DE 10 2007 034 581 B4 details an air pipe connection that has an access opening for a filling chamber in which a closure part is arranged. The closure part closes the access opening and is pressed against the access opening by means of a return part. When an air pipe is connected to the air pipe connection, the air pipe is guided through the access opening and presses the closure part away from the access opening against the resistance of the restoring part. This opens the access opening. When the air pipe is removed from the access opening, the closure part is pushed back against the access opening by the return part and closes it again. This type of valve requires a large radial installation space. As the radial size increases, so do the requirements for the accuracy of fit of the sealing surfaces and the quantity of materials used. This makes these valves cost-intensive.

The invention discloses a pressure retaining valve for an air spring which requires little radial installation space, at least in sections, and is inexpensive.

Features and embodiments of the invention are disclosed herein.

SUMMARY

In one aspect, the invention relates to a pressure retaining valve for an air spring, the pressure retaining valve comprising: a first valve body for placement in an opening of an air spring, the first valve body having an access opening fluidly communicable with a conduit; a second valve body connected to the first valve body, the second valve body comprising a chamber fluidly communicable with the access opening and having at least one lateral outlet opening fluidly communicable with an air spring; a return part for providing a bias toward the access opening, the return part being disposed outside the access opening in the chamber; a closure part disposed in the chamber; the closure part being movable against the bias from a closed state in which the access opening is closed to an open state in which the access opening is open; characterized by and an actuator part having a head portion, a stem portion extending away from the head portion, and at least one flow channel extending from the head portion at least partially along the stem portion, the head portion being disposed on a side of the access opening facing away from the chamber outside the access opening and having a larger diameter than the access opening, wherein the shaft portion is movably disposed through the access opening into the chamber, and the actuator part is adapted to move the closure part out of the closed state when a force acting on the head portion against the bias, which is greater than the bias, moves the actuator part with the shaft portion out of the access opening into the chamber.

The invention provides a low cost pressure retaining valve that opens when coupled to a conduit to the extent that the conduit presses on the head portion, and that closes when the conduit does not press on the head portion. This allows the air pipe to be pre-assembled and clamped in a line retaining device without causing the valve to open. Only upon further insertion, which results in the head section being pressed down, is the pressure retaining valve transferred to the open state. For this purpose, the pressure retaining valve has an access opening which can be connected to a chamber in which at least one lateral outlet opening is arranged. Air can flow out of the outlet openings into an air spring when the pressure retaining valve is mounted in the opening of an air spring. The access opening of the pressure retaining valve can be closed by means of the closing part. For this purpose, the closure part is pressed by means of a return part in the direction of the access opening into the closed state in which the closure part closes the access opening. The return part is thus arranged in an installation situation on a side facing the air spring. The closure part is arranged between the return part and the access opening. The closure part therefore shields the return part from the air flowing through the pressure-retaining valve. Since the return part is located outside the access opening in the chamber, it can be of almost any size without affecting the radial space of the valve in the access opening section and leading to a large radial diameter in this area. The closure part can further be moved by means of a coupled line via the actuator part from the closed state to the open state, in which the access opening is open. For this purpose, the actuator part extends through the access opening and couples the conduit to the closure part. The actuator part has a head portion that has a larger diameter than the access opening and is disposed outside the access opening. Thus, the head portion cannot be inserted into the access opening. Further, the head portion is also disposed outside the chamber on the other side of the access opening. A shaft portion of the actuator part extends through the access opening and, when a force is applied to the head portion, can be moved into the chamber to actuate the closure part. A conduit can be coupled to the head portion. With the coupling, a force can be caused to act on the head section by means of the conduit. The stem section transmits this force to the closure part through the access opening. When the force overcomes the resistance that the reset part causes on the closure part, the closure part moves from the locked state to the open state. The line itself is not guided through the access opening and is not in direct contact with the closure part. Since the line does not have to pass through the access opening in order to actuate the closure part, the access opening can thus be formed with a smaller diameter than the line. Thus, the entire pressure retaining valve can be formed with a reduced footprint. The actuator part further comprises at least one flow channel extending from the head portion at least partially along the stem portion. Thus, in the open state, the flow channel creates a fluid communicating connection along the access opening, between the conduit coupled to the head section and the chamber. The access opening itself is free of flow channels carrying air from the conduit along the actuator section into the chamber. This prevents the access opening from being enlarged by additional flow channels. The closure part thus requires only a slightly larger diameter than the access opening to be able to close it. This allows the space requirement of the pressure retaining valve to be further reduced. The reduced space requirement also reduces the cost of the pressure retaining valve. Further, the components of the pressure retaining valve, with the exception of the closure part, can have large tolerances without compromising their function. By increasing the tolerances in the manufacture of, in particular, the access port, the actuator part and the first and second valve bodies, further costs can be saved in the manufacture of the pressure retaining valve. If the second valve body is manufactured using an injection molding or die casting process, no holes are needed to form the side outlet openings. Instead, the side outlet openings can be produced inexpensively by means of slides in the injection molding or pressure die casting tool.

According to one example, it is possible that the first valve body, the second valve body and/or the actuator part are made of plastic or a cast alloy. This means that no or only little machining or mechanical reworking of the components is required.

Due to the large tolerances made possible by the invention, plastics or cast alloys can be used for the components of the pressure retaining valve. Thus, the costs of manufacture can be further reduced in contrast.

In another example, the first valve body, the second valve body, and/or the actuator part may be injection molded and/or die cast parts.

Injection-molded and/or die-cast parts are regularly very cost-effective, especially if a large number of units are produced. The injection-molded and/or die-cast parts can be made of plastic or metal, in particular aluminum.

The first valve body and the second valve body can be connected, for example, by means of a snap connection. For this purpose, it is advantageous if the valve body with the resilient snap elements is made of plastic.

This allows the first valve body and the second valve body to be manufactured separately from each other. The two valve bodies can only be connected to each other by means of the snap connection when the pressure-maintaining valve is assembled. The snap connection can, for example, have snap hooks so that the two valve bodies only have to be plugged together when the pressure retaining valve is assembled. This pre-assembly allows the pressure retaining valve to be mounted as a pre-assembly unit in a valve seat in an opening of an air spring. Alternative ways of connecting the two valve bodies are also conceivable, such as a screw connection, a bayonet lock, an ultrasonic welded connection or a friction or force-fit connection.

Further, the head portion may have at least one line contact surface for applying a line termination forming a partial surface of a ring, the ring having a larger diameter than the access opening.

The ring thus also has a larger diameter than the shaft section. A tubular line that can be coupled to the line contact surface with a line end piece can thus not be inserted into the access opening. The opening of an air spring that can be coupled to the line and the pressure retaining valve can thus have a diameter that only needs to be large enough to receive and retain a line or line retaining device.

It is further possible that the shaft section has, for example, an abutment surface which is designed to abut against the closure part.

There is thus no fixed connection between the actuator part and the closure part. The actuator part can therefore be moved along the access opening detached from the closure part, particularly in the locked state. This simplifies the manufacture of the pressure retaining valve, since the actuator part only has to be inserted with the shaft section into the access opening. Coupling of the impact surface with the closure part takes place automatically when a force is applied to the head section by means of a line.

In another example, the flow channel may extend externally of the actuator part.

This can further simplify the manufacture of the actuator part. In contrast to a flow channel that extends inside the actuator part, only the outer shape of the actuator part is adapted when manufacturing the externally arranged flow channel.

For example, the actuator part may include four flow channels extending externally of the actuator part and together having a cruciform cross-section The increased number of flow channels increases the possible flow volume and reduces the flow resistance of the actuator part. Furthermore, the actuator part with a cruciform cross-section has a stable and rigid shape.

Further, the pressure retaining valve may include, for example, an anti-loss device for the actuator part, which is configured to restrict movement of the stem section in the access opening away from the chamber.

A movement of the stem section in the direction of the head section out of the access opening is thus prevented. In the locked state, when no line is coupled to the pressure retaining valve or the line retaining device is disassembled, this prevents the actuator section from being removed from the access opening and lost. This increases the operational reliability of the pressure retaining valve.

For example, the loss prevention device may include at least one first snap-hook part disposed at the access opening and at least one second snap-hook part disposed at the shank portion.

When mounting the actuator part in the access opening, the shaft section can be inserted into the access opening at an end of the access opening opposite the chamber. The second snap-hook part is arranged to engage with the first snap-hook part when the shaft section is not yet inserted into the chamber.

Further, according to one example, the first valve body may include a sealing part for abutting a wall portion of an opening of an air spring and extending externally around the first valve body.

The first valve body uses the sealing part to seal the opening of an air spring, in which the pressure retaining valve is inserted, to the external environment, in particular when the line and/or the line retaining device is dismantled.

In another aspect, the invention relates to an air spring comprising an air spring chamber having an opening, wherein a pressure retaining valve according to the previous description is arranged in a first part of the opening facing towards the air spring chamber and a line retaining device is arranged in a second part of the opening facing away from the air spring chamber.

Advantages and effects as well as further developments of the air spring result from the advantages and effects as well as further developments of the pressure retaining valve described above. Reference is therefore made in this respect to the preceding description.

According to one example, the pressure retaining valve can project at least partially, in particular with at least a part of the second valve body, into the air spring chamber. In particular, a part of the second valve body in which the return element is arranged can project completely into the air spring chamber.

The pressure retaining valve thus only requires a valve seat in the opening of the air spring within a small axial extension length. The return element can be of any size, since it is arranged with the second valve body not in the opening but only in the air spring chamber. This simplifies the assembly of the pressure retaining valve in the air spring. In this case, the second valve body can be connected to the first valve body after mounting the first valve body in the opening. The pressure retaining valve is not preassembled in this case.

It is further possible, for example, that the pressure retaining valve is fixed in an axial direction of the opening by the line retaining device.

In particular, in the locked state, when the air spring is under pressure, the pressure retaining valve is secured in the opening of the air spring. The line retaining device reduces the risk of the pressure retaining valve being pressed into the opening from inside the air spring in the locked state or being pressed out of the air spring through the opening.

BRIEF DESCRIPTION OF THE DRAWINGS

Further features, details and advantages of the invention are apparent from the wording of the claims and from the following description of embodiments based on the drawings. Showing:

DETAILED DESCRIPTION

In the following, the pressure maintaining valve is referenced in its entirety by the reference sign 10.

Figure 1A:
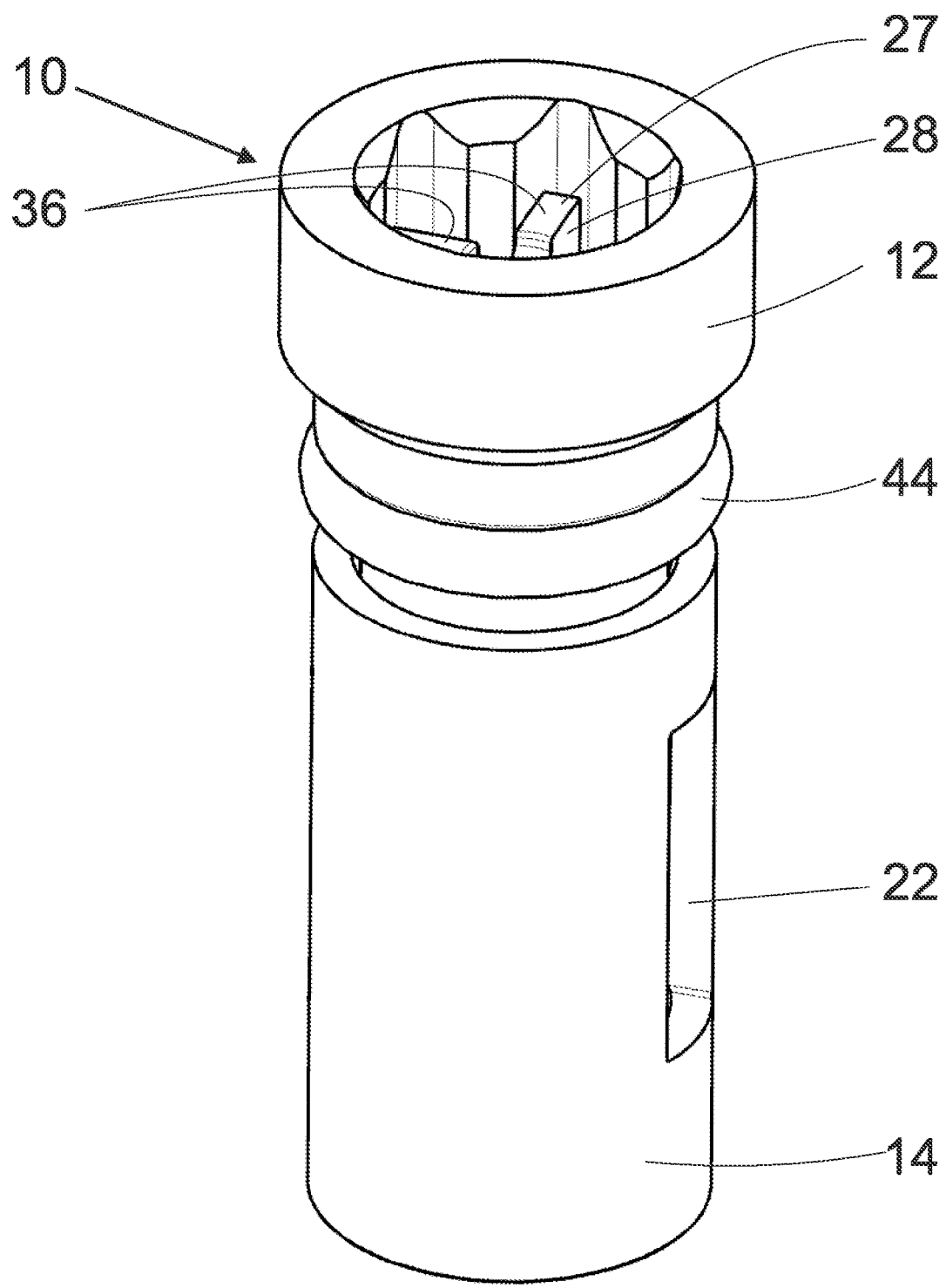
FIG. 1a-c a schematic representation of a pressure retaining valve in the shut-off state.
Figure 1B:
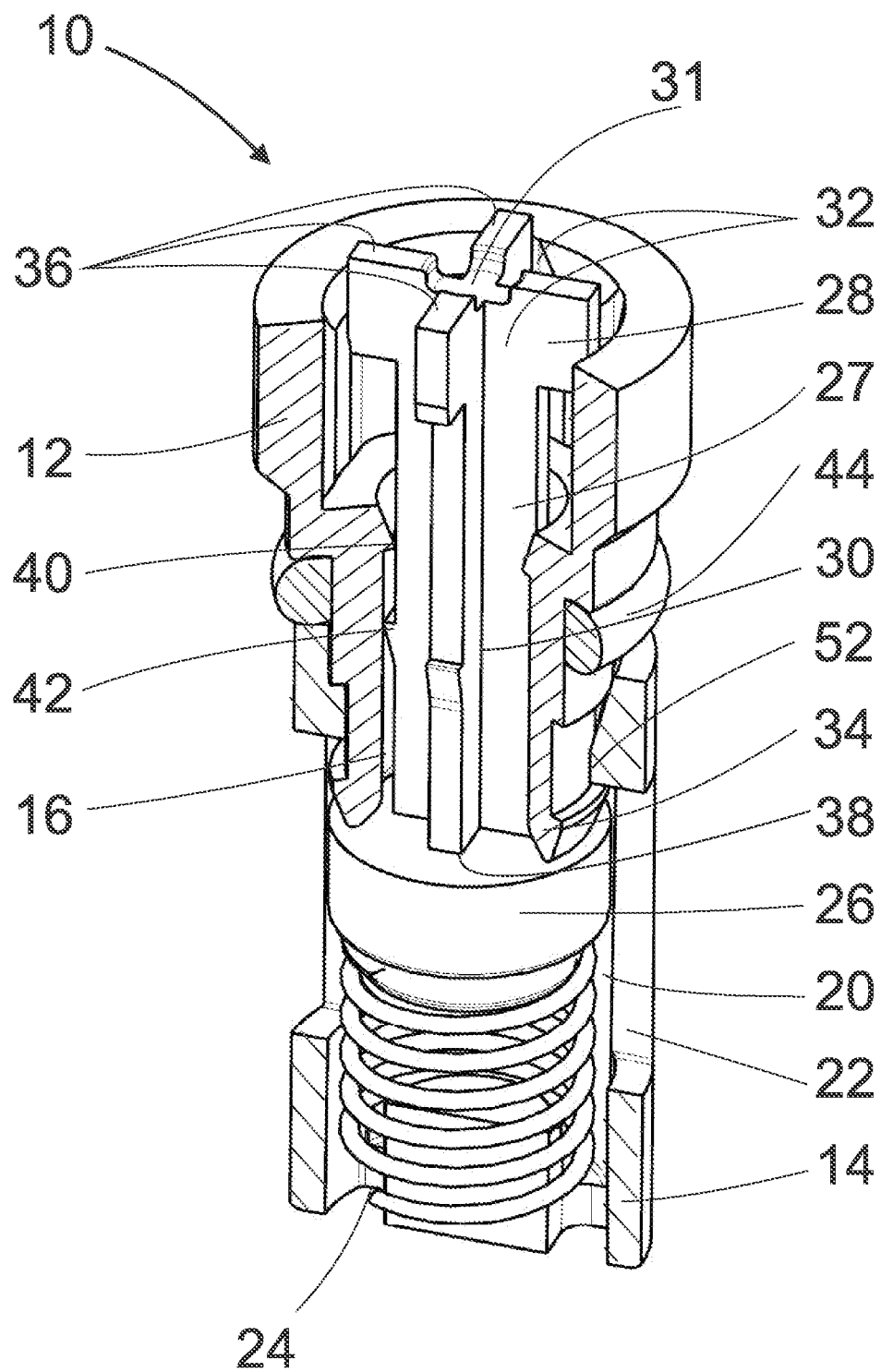
Figure 1C:
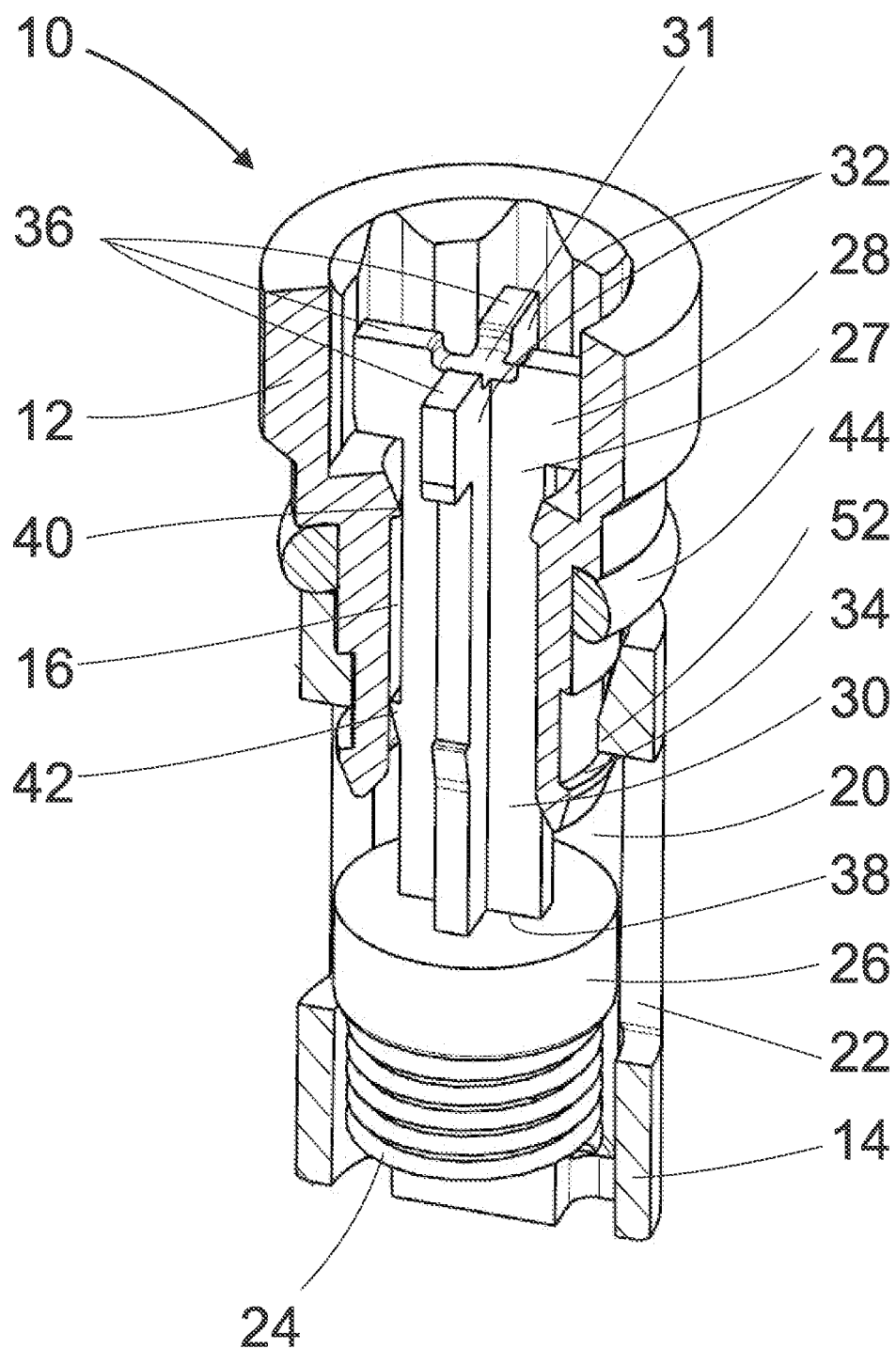

FIGS. 1a, 1b, and 1c illustrate the pressure retaining valve 10. FIG. 1a depicts the pressure retaining valve 10 in its entirety. According to FIG. 1a, the pressure retaining valve 10 has a first valve body 12 and a second valve body 14.

In FIGS. 1b and 1c, a portion of the pressure retaining valve 10 is not shown to provide a view into the interior of the valve bodies 12 and 14. Accordingly, the pressure retaining valve 10 further comprises a return element 24, a closure part 26, and an actuator part 27.

The first valve body 12 is designed to be inserted into an opening of an air spring. A sealing part 44 extends around the first valve body 12 to seal a gap between the opening of the air spring and the first valve body 12.

An access opening 16 extends through the first valve body 12, which can be fluidly connected to a conduit. The conduit can connect the access opening 16 to a pressure source to direct air through the pressure retaining valve 10 into the air spring. The pressure retaining valve 10 is configured as an inlet valve for this purpose.

The first valve body 12 is connected to a second valve body 14, which has a chamber 20. The access opening 16 opens into the chamber 20, which has at least one lateral outlet opening 22. The connection of the two valve bodies 12, 14 can be effected by means of a snap connection. Alternative ways of connecting the two valve bodies 12, 14 are also conceivable, such as a screw connection, a bayonet connection, an ultrasonically welded connection or a frictional or force-fit connection. For this purpose, the first valve body 12 can have a first snap hook part 34 and the second valve body 14 can have a second snap hook part 52. The snap hook portions 34, 52 are formed such that they can be snapped together to connect the first valve body 12 to the second valve body 14. The second snap hook portion 52 may be disposed at the side outlet opening 22, such that the first snap hook part 34 is partially disposed in the outlet opening 22 when engaged.

The closure part 26 is arranged in the chamber 20. The closure part 26 is pressed against the access opening 16 by means of a return element 24 and blocks or closes the access opening 16, as shown in FIG. 1b. In this position, the closure part 26 is in the blocking state. In this example, the return element 24 is located outside the access opening 16 and also in the chamber 20. It causes a bias in the direction of the access opening 16.

Actuator part 27 is disposed in access opening 16 with a shaft portion 30 extending away from a head portion 28 of actuator part 27. The head portion 28 has a larger diameter than the access opening 16 and cannot be inserted into the access opening 16. Further, the access opening 16 is disposed between the head portion 28 and the chamber 20.

At least one flow channel 32 extends along the shaft section 30. The flow channel 32 begins at the head section 28. In this example, the actuator part 27 includes four flow channels 32 that begin at an end face of the head section 26. A recess 31 may be disposed on the end face from which the flow channels 32 extend in the direction of the shaft section 30.

The actuator part 27 is movably disposed along the access opening 16. It can be moved with the shaft portion 30 through the access opening 16 such that the shaft portion 30 is moved into the chamber 20. As the shaft portion 30 is moved into the chamber 20, an abutment surface 38 of the shaft portion 30 abuts a surface of the closure part 26. When the actuator part 27 is moved toward the chamber 20 with a force greater than the bias of the return element 24, the closure part 26 is moved away from the access opening 16 to the open state. This is illustrated in FIG. 1c.

Figure 2:
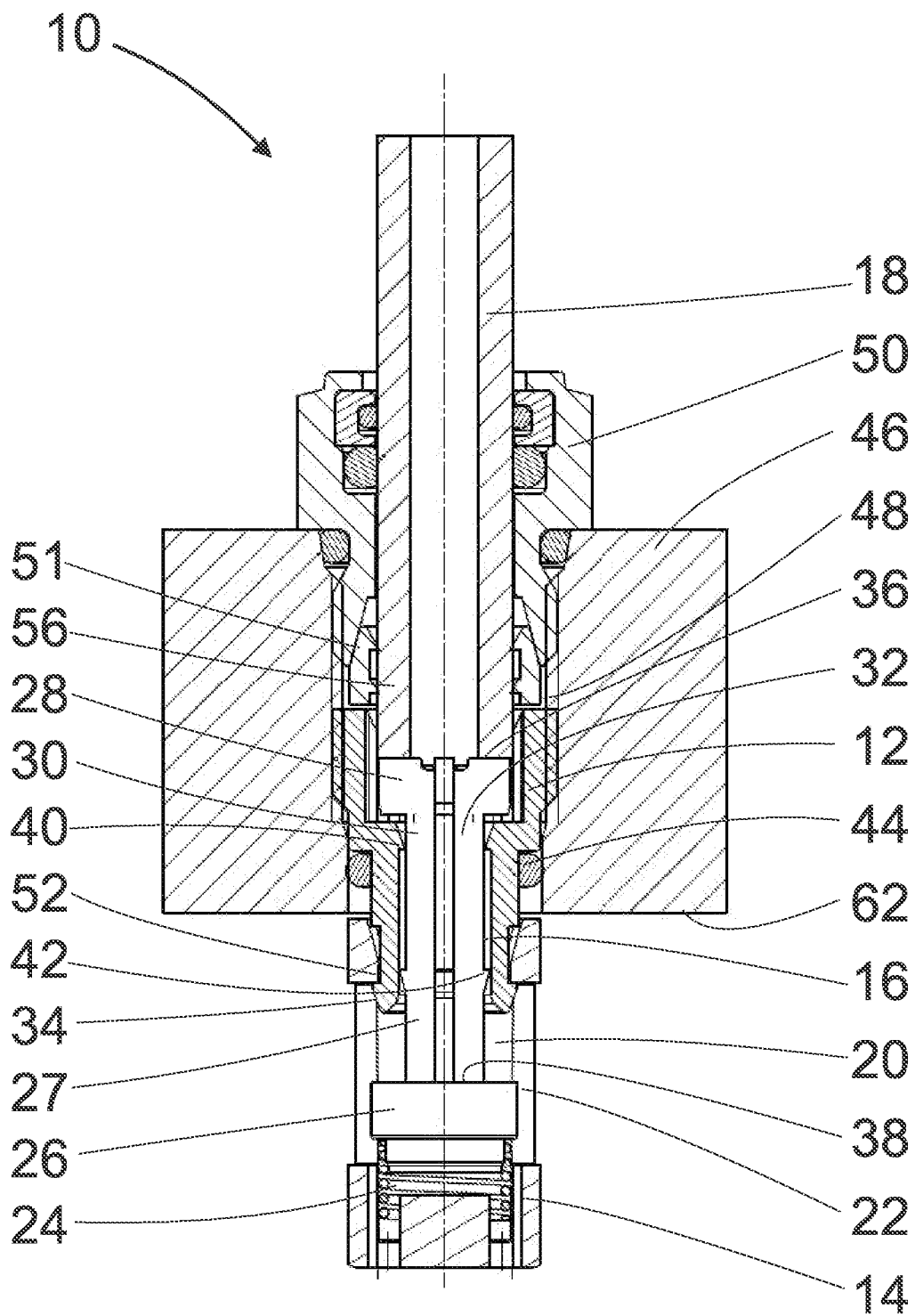
FIG. 2 a schematic sectional view of a pressure control valve in the open position.

Referring to FIG. 2, this force can be transmitted by means of a conduit 18 coupled to a conduit contact surface 36 of the head portion 28 by a conduit end piece 56. In FIG. 2, the closure part 26 is in the open condition. Further shown is a portion of an air spring 46 that includes an opening 48. The pressure retaining valve 10 is disposed in a first portion of the opening 48 that faces an air spring chamber 62 of the air spring 46. A lead retaining device 50 is disposed in a second portion of the opening 48 that faces away from the air spring chamber 62 of the air spring 46. In this example, a conduit 18 may be passed through the conduit retaining device 50. A retaining ring 51 prevents movement of the line 18 out of the line retaining device 50. Thereby, when the conduit 18 is inserted into the conduit retaining device 50, it is already held by the conduit retaining device 50 before it comes into contact with the head portion 28. In this example, the conduit 18 can only be removed from the opening 48 when the conduit retaining device 50 is removed from the opening 48.

The line 18 can be guided through the line retaining device 50 until it contacts the line contact surface 36 of the actuator part 27. The line contact surface 36 is a partial surface of a ring which has a larger diameter than the access opening 16. Further insertion of the lead 18 with a force greater than the bias of the return element 24 causes the actuator part 27 with the shaft portion 30 to move the locking part 26 from the locking state to the opening state.

Line 18 is inserted only after line retaining device 50 and pressure retaining valve 10 have been installed in opening 48.

In this example, the fixation of the pressure retaining valve 10 in the opening 48 is effected by means of the first valve body 12.

As further shown in FIG. 2, most of the second valve body 14 extends from the opening 48 into the air spring chamber 62 of the air spring 46. In particular, a portion of the second valve body 14 in which the return element 24 is disposed extends into the air spring chamber 62. The side outlet ports 22 are in fluid communication with the air spring chamber 62. When open, there is fluid communication between the air spring chamber 62 and the conduit 18 via the side outlet openings 22, the chamber 20, and the access opening 16 or flow channels 32. The return element 24 is disposed substantially outside of a flow of air flowing along the fluid communication. It is shielded from the air flow by the closure part 26.

To prevent movement of the actuator part 27 out of the access opening 16, the pressure retaining valve 10 includes an anti-loss device for the actuator part 27. The anti-loss device includes a first snap hook element 40 at the access opening 16. At the stem portion 30, the loss prevention device includes a second snap-hook element 42. The snap-hook elements 40, 42 are configured such that they can be moved against each other only in the direction of the chamber 20 after the second snap-hook element 42 has passed the position of the first snap-hook element 40. A movement against this direction is blocked after the actuator part 27 with the shaft section 30 has been inserted into the access opening 16, as soon as the second snap hook element 42 with the shaft section 30 is moved to the position of the first snap hook element 40.

The first valve body 12, the second valve body 14 and/or the actuator part 27 can be made of plastic and manufactured by injection molding. Alternatively, these components can be made of a metal, e.g. aluminum. In this case, they can also be manufactured by injection molding or die casting.

Since the first valve body 12, the second valve body 14 and the actuator part 27 are merely plugged into each other and do not have to have sealing surfaces against each other, the tolerances of these components can be large. This favors low-cost manufacture and assembly of these components. Only the sealing surfaces between the access opening 16 and the closure part 26 should be manufactured within small tolerances, in particular with regard to the flatness of the sealing surface, in order to effect a secure seal in the locked state.

Figure 3:
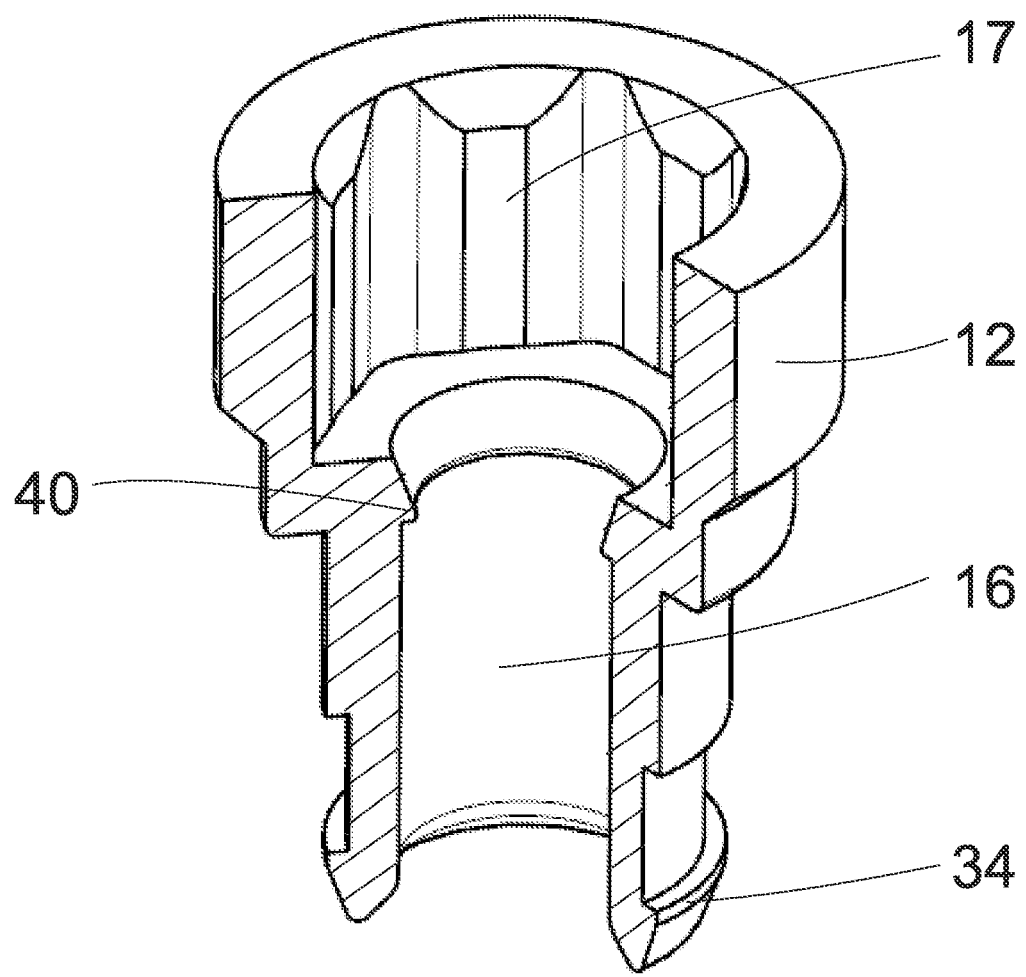
FIG. 3 a schematic representation of a first valve body.

FIG. 3 shows a schematic sectional view of the first valve body 12 with the access opening 16 and the first snap hook element 40. Further, the first valve body 12 has a receptacle 17 comprising a larger diameter than the access opening 16. The head portion 28 of the actuator part 30 can be disposed in the receptacle 17.

Figure 4A:
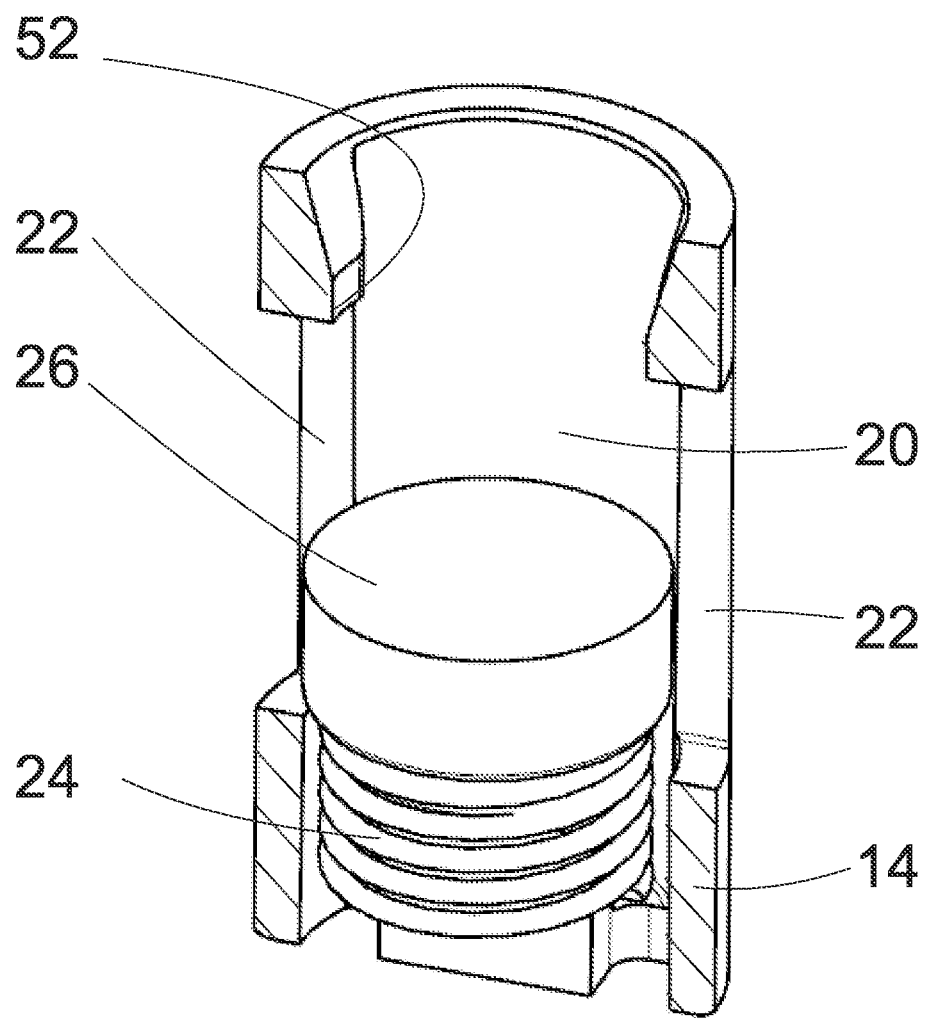
FIG. 4a, b a schematic representation of a second valve body.
Figure 4B:
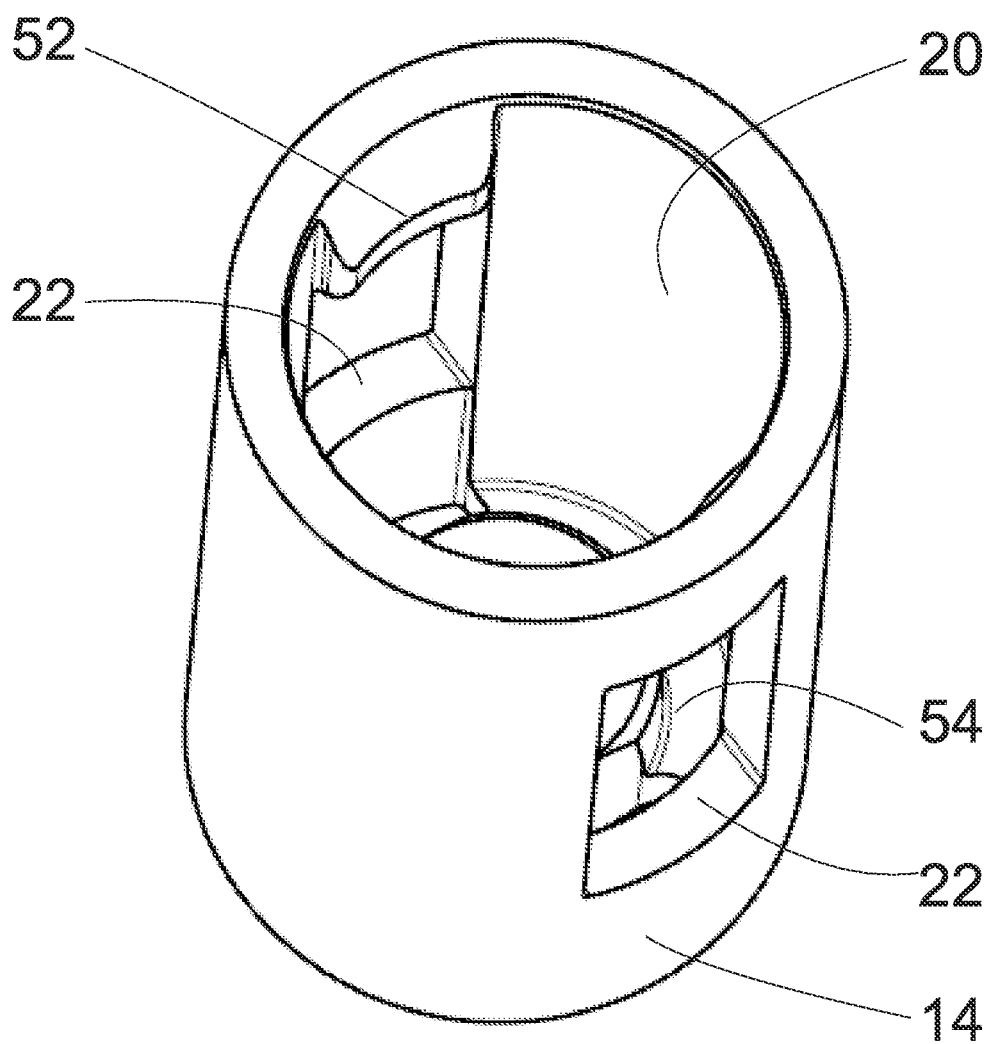

FIGS. 4a and 4b show the second valve body 14 with the chamber 20, the second snap-hook portion 52, and two side outlet openings 22.

Further, the closure part 26 with the return element 24 is shown in FIG. 4a. The closure part 26 is shown in the open state, with a force acting on the closure part 26 that overcomes the resistance or pretension of the return element 24.

FIG. 4b shows the second valve body 14 from another view. The arrangement of the second snap-hook element 52 above the lateral outlet opening 22 is clearly visible. Furthermore, a seat 54 for the return element 24 can be seen, which can be designed as a helical spring.

Figure 5A:
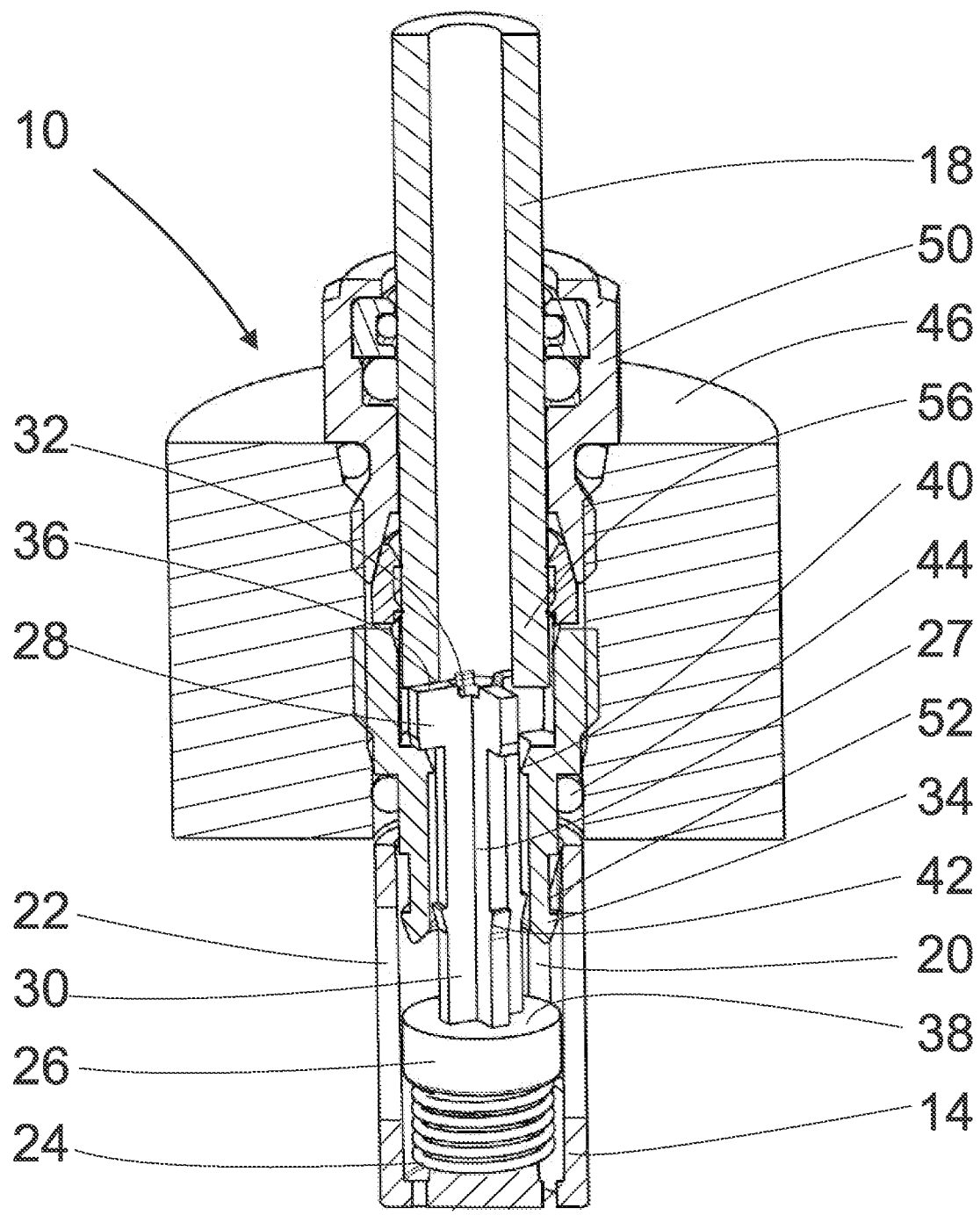
FIG. 5a, b a schematic representation of a further embodiment of the pressure-retaining valve.
Figure 5B:
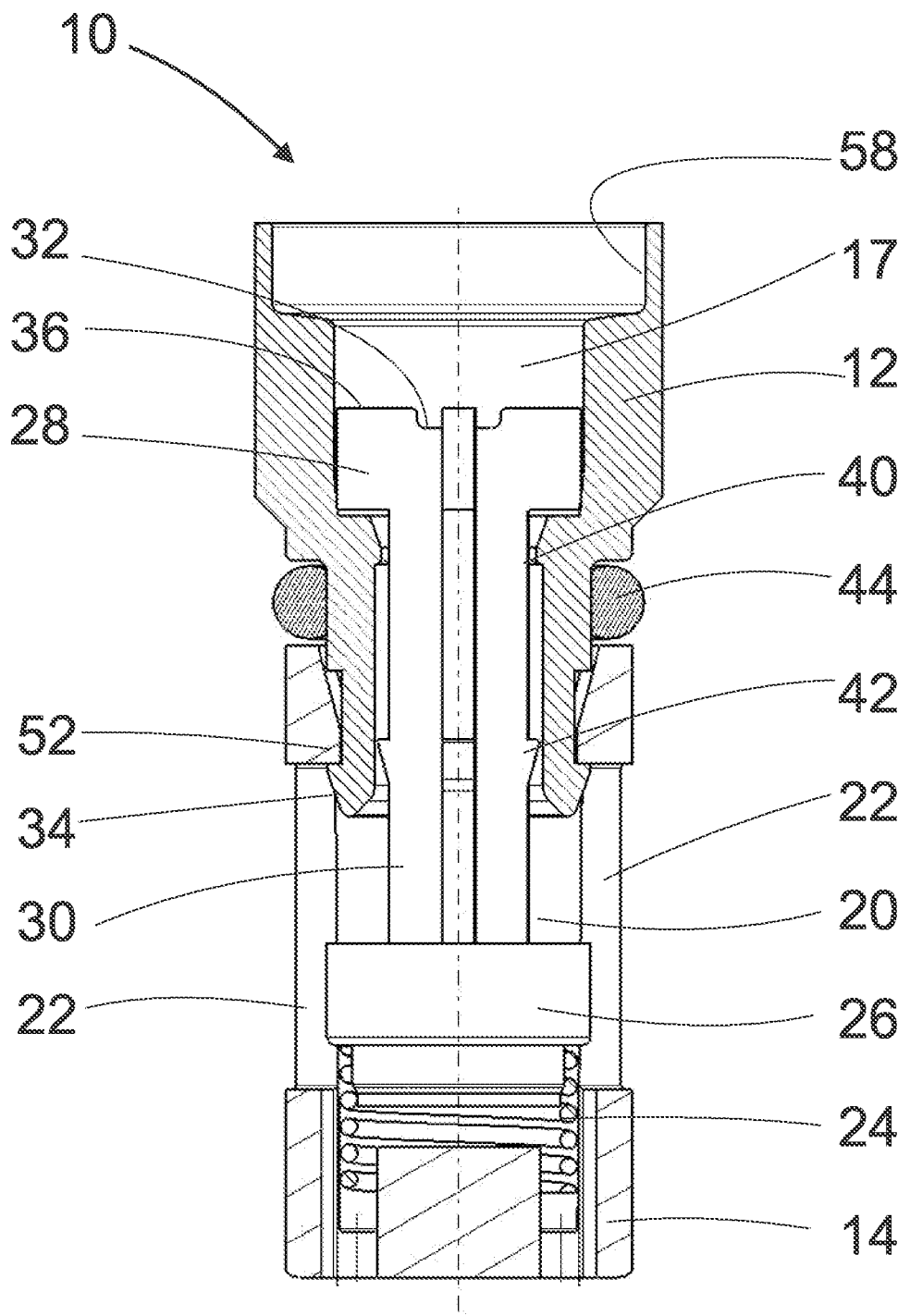

FIGS. 5a and 5b show a pressure retaining valve 10 in an alternative embodiment.

According to FIG. 5a, a line retaining device 50 and a pressure retaining valve 10 are arranged in the opening 48 of an air spring 46. The line retaining device 50 is designed in such a way that a line 18 can be removed from the line retaining device 50.

In this example, the fixation of the pressure retaining valve 10 in the opening 48 is effected in the direction of the air spring chamber 62 by means of the first valve body 12. In the opposite direction, the pressure retaining valve 10 can be fixed in the axial direction by means of the line retaining device 50.

In FIG. 5b, the pressure retaining valve 10 of this example is shown alone. The first valve body 12 comprises a further receptacle 58 above the receptacle 17 for receiving a further sealing element 60. The sealing element 60 seals the line 18 against the line holding device 50 and the external environment.

The invention is not limited to any of the above-described embodiments, but can be modified in a variety of ways.

All features and advantages resulting from the claims, the description and the drawing, including constructional details, spatial arrangements and process steps, can be useful for the invention both individually and in the most diverse combinations.

The invention claimed is:

1. A pressure retaining valve for an air spring, the pressure retaining valve comprising:
    a first valve body for placement in an opening of an air spring, the first valve body having an access opening fluidly connectable to a conduit;
    a second valve body connected to the first valve body, the second valve body comprising a chamber fluidly communicatively connected to the access opening and having at least one side outlet opening fluidly communicatively connectable to an air spring;
    a return element for providing a bias toward the access opening, the return element being disposed outside the access opening in the chamber;
    a closure part disposed in the chamber; the closure part being movable against the bias provided by the return element from a closed state in which the access opening is closed to an open state in which the access opening is open; and
    an actuator part having a head portion, a shaft section extending from the head portion, and at least one flow channel extending from the head portion at least partially along the shaft section, the head portion being disposed on a side of the access opening facing away from the chamber outside the access opening and having a larger diameter than the access opening, wherein the shaft section is movably disposed through the access opening into the chamber, and the actuator part is adapted to move the closure part out of the closed state when a force acting on the head portion against the bias provided by the return element, which is greater than the bias provided by the return element, moves the actuator part with the shaft section out of the access opening into the chamber.

2. An air spring comprising:
an air spring chamber with an opening,
wherein a pressure retaining valve according to claim 1 is arranged in a first part of the opening directed towards the air spring chamber and a line retaining device is arranged in a second part of the opening directed away from the air spring chamber.

3. The air spring according to claim 2, wherein the pressure retaining valve projects at least partially, in particular with at least a part of the second valve body, in which at least the return element is arranged, into the air spring chamber.

4. The air spring according to claim 2, wherein the pressure retaining valve is fixed by the line retaining device in an axial direction of the opening.

5. The pressure retaining valve according to claim 1, wherein the pressure retaining valve comprises an anti-loss device for the actuator part, which is configured to limit a movability of the shaft section in the access opening away from the chamber.

6. The pressure retaining valve according to claim 5, wherein the anti-loss device comprises at least one first snap hook element arranged at the access opening and at least one second snap hook element arranged at the shaft section.

7. The pressure retaining valve according to claim 1, wherein the first valve body, the second valve body and/or the actuator part are made of plastic.

8. The pressure retaining valve according to claim 1, wherein the first valve body, the second valve body and/or the actuator part are injection molded parts and/or die cast parts.

9. The pressure retaining valve according to claim 1, wherein the first valve body and the second valve body are connected by a snap hook.

10. The pressure retaining valve according to claim 1, wherein the head portion has at least one line contact surface for application of a conduit end piece forming a partial surface of a ring, the ring having a larger diameter than the access opening.

11. The pressure retaining valve according to claim 1, wherein the shaft section has an abutment surface adapted to abut the closure part.

12. The pressure retaining valve according to claim 1, wherein the flow channel extends externally on the actuator part.

13. The pressure retaining valve according to claim 1, wherein the actuator part comprises four flow channels extending externally on the actuator part and together having a cruciform cross-section.

14. The pressure retaining valve according to claim 1, wherein the first valve body comprises a sealing element for abutment against a wall portion of an opening of an air spring and extending externally around the first valve body.

* * * * *